United States Patent Office 3,280,083
Patented Oct. 18, 1966

3,280,083
HIGHLY-FLUORINATED MONOMERS, POLYMERS AND COPOLYMERS
Anthony J. Butler, George A. Grindahl, and Ogden R. Pierce, Midland, Mich., assignors to Dow Corning Corporation, Midland, Mich., a corporation of Michigan
No Drawing. Filed Feb. 7, 1964, Ser. No. 343,214
4 Claims. (Cl. 260—82.1)

This invention relates to new, highly-fluorinated polymers and copolymers, and new monomers from which they are made.

The polymers and copolymers of this invention exhibit fine solvent and heat resistance, and show promise as new additions to the field of moldings and coatings.

The polymeric compositions of this invention can be described as a polymer comprising

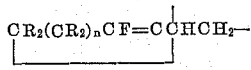

units, where each R can be hydrogen, fluorine, or a perfluoroalkyl radical, no more than one R group being hydrogen, and $n$ is an integer of 2 to 3.

Other copolymeric units can also be present in the compositions of this invention, such as those which are selected from the group consisting of

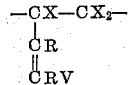

units, where X is selected from the group consisting of fluorine and hydrogen, at least one X being hydrogen, V is selected from the group consisting of the trifluoromethyl radical and fluorine, and R is as defined above, the number of X's that are hydrogen exceeding the number of R's that are hydrogen;

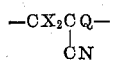

units, where X is as defined above, and Q is selected from the group consisting of hydrogen, fluorine, and methyl, at least one of the above symbols being H; —CZ₂CX=CXCZ₂— units, where Z is selected from the group consisting of the trifluoromethyl radical, fluorine, and hydrogen, and X is selected from the group consisting of fluorine and hydrogen; and

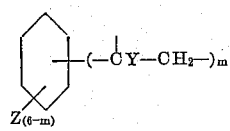

units, where $m$ is an integer of 1 through 2, Y is selected from the group consisting of methyl radicals and hydrogen, and Z is as defined above.

R can consist of fluorine, hydrogen, or any perfluoroalkyl radical such as trifluoromethyl, pentafluoroethyl, perfluoroisobutyl, perfluorooctyl, etc.

The polymers and copolymers of this invention can be made by polymerizing (1) the monomer of this invention (a new composition of matter),

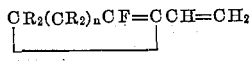

with itself, or with other conjugated olefins such as (2):

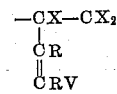

$CX_2=CQ—CN$, $CZ_2=CXCX=CZ_2$, and

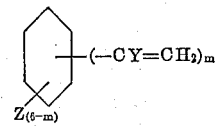

where the symbols are as defined above.

The copolymers of this invention can be made with more than one species of the monomer of this invention.

It is preferred for the copolymers of this invention to contain from 5 to 95 mol percent of the unit or units formed from ingredient (1) and from 95 to 5 mol percent of the unit or units formed from ingredient 2.

The polymerization reaction may be conveniently effected by using a redox initiation, as in Example 3.

The monomer of this invention can be made by dehydrofluorinating (3) 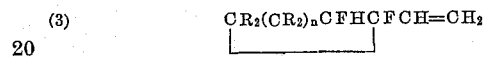

by means of anhydrous lithium hydroxide, with mineral oil as a medium. A reflux for several hours is usually required.

Compound (3) can be prepared by dehydration in the following manner:

(4) 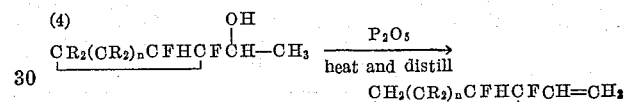

Compound (4) can be prepared in the following manner:

(5) 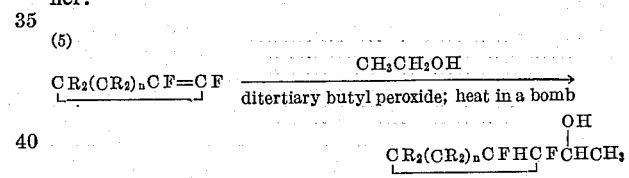

The ingredients listed under (2) above are known to the art.

It should be noted that practically all of the polymerization of the monomer of this invention takes place only on the terminal double bond. This leaves cycloolefinic pendant groups along the main chain. Many of the ingredients (2) also copolymerize to form pendant groups along the polymer chain.

The following examples are illustrative only and should not be construed as limiting the invention, which is properly delineated in the appended claims.

Example 1

240 g. of

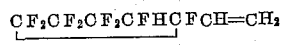

36 g. of anhydrous lithium hydroxide, 200 ml. of mineral oil, and a trace of hydroquinone as a polymerization inhibitor were placed in a 500 ml. flask and refluxed with vigorous stirring for 16 hours.

The volatiles were then stripped to obtain 171 g. of

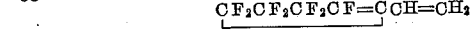

A trace of

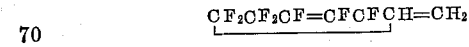

was also recovered.

Example 2

To an 8 inch polymer tube was added 0.2 g. of $K_2S_2O_8$ and 0.6 g. of potassium perfluorooctoate. Following an $N_2$ purge of the tube, 20 g. of

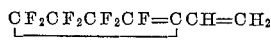

was slowly added, with intermittent $N_2$ purges. Finally, 40 g. of water were added. The tube was then evacuated and placed under an $N_2$ atmosphere at atmospheric pressure and sealed. The tube was agitated in warm (45° C.) water for 20 hours.

The product was coagulated, washed with water, and dried.

18 g. of a homopolymer of the above vinylperfluorocyclopentene was recovered. It was a white powder which softens to a viscous, flowing material at 250° C.

The polymer was placed for 18 hours at 250° C. in a forced air oven. Its weight loss was 12.7%.

Infrared spectroscopy showed that the polymerization had occurred only on the vinyl groups leaving the unsaturated rings as pendant groups.

The homopolymer is insoluble in common, organic solvents.

Example 3

Copolymers of

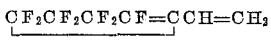

and $CH_2=CHCN$ were made by the following procedure.

The following were placed in a polymer tube and agitated in a 50° C. water bath for 20 hours:

| | Batch A, grams | Batch B, grams |
|---|---|---|
| 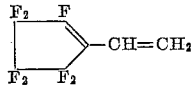 | 10.8 | 7.2 |
| $CH_2=CHCN$ | 7.2 | 10.8 |
| Water | 32 | 32 |
| $K_2S_2O_8$ | 0.25 | 0.25 |
| $NaHSO_3$ | 0.12 | 0.12 |
| $FeSO_4 \cdot 7H_2O$ | 0.012 | 0.012 |
| $C_7F_{15}COOK$ | 0.5 | 0.5 |

Both batches yielded copolymers that were then coagulated, washed, and dried. They were both white thermoplastic powders that were insoluble in carbon tetrachloride, benzene, tetrachloroethylene, acetone, and boiling, concentrated KOH solution. The copolymers were composed of units of the formulae

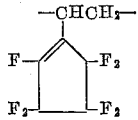

and

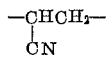

Example 4

A copolymer of

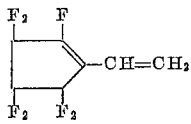

and $CH_2=CHCH=CH_2$ was prepared in the following manner:

To a polymer tube was added 15 g. of

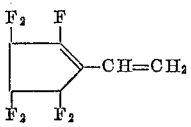

17.5 g. of $CH_2=CHCH=CH_2$, 53 g. of water buffered at pH 10, 0.25 g. of $K_2S_2O_8$, 0.13 g. of $NaHSO_3$, 0.013 g. of $FeSO_4 \cdot 7H_2O$, 0.83 g. of $C_7F_{15}COOK$.

The tube was agitated in a 50° C. water bath for 20 hours.

The copolymer product was coagulated, washed, and dried. It was elastomeric, and insoluble in hot acetone and hot benzene.

Example 5

A copolymer of

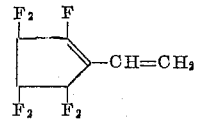

and $CF_2=CFCH=CH_2$ was prepared in the following manner:

The following was placed in a stainless steel bomb: 10.8 g. of

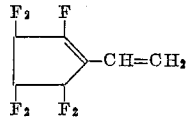

14.2 g. of $CF_2=CFCH=CH_2$, 0.17 g. of $K_2S_2O_8$, 0.0085 g. of $FeSO_4 \cdot 7H_2O$, 0.085 g. $NaHSO_3$, 0.85 g. of $C_7F_{15}COOK$, and 60 ml. of water buffered to pH 10.

The bomb was agitated on an Amnico rocker at 50° C. for 18 hours.

The product was precipitated with methanol and saturated salt water, and dried at 90° C.

23 g. of a tough, elastomeric copolymer was recovered, consisting essentially of

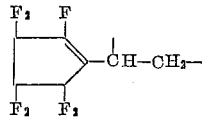

units and

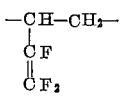

units.

Example 6

When 100 g. of the following compounds are mixed with 36 g. of anhydrous lithium hydroxide, 200 ml. of mineral oil, and trace of hydroquinone as a polymerization inhibitor, and the mixture is refluxed for 20 hours, the following products are obtained:

| Reactant | Product |
|---|---|
| $CF_2CFCF_2CFHCFCH=CH_2$ with $CF_3$ on 2nd C | $CF_2CFCF_2CF=CCH=CH_2$ with $CF_3$ on 2nd C |
| $CHCF_2CFCFHCFCH=CH_2$ with $C_8F_{17}$ and $CF_3$ | $CHCF_2CFCF=CCH=CH_2$ with $C_8F_{17}$ and $CF_3$ |
| $CF_2(CF_2)_3CFHCFCH=CH_2$ | $CF_2(CF_2)_3CF=CCH=CH_2$ |
| $CF(CF)_2CF_2CFHCFCH=CH_2$ with $C_3F_7$ and $CH_3$ | $CF(CF)_2CF_2CF=CCH=CH_2$ with $C_3F_7$ and $CH_3$ |

Example 7

When 20 g. of mixtures of the following compounds are shaken together and warmed in the presence of 30 g. of water, 0.25 g. of $K_2S_2O_8$, 0.12 g. of $NaHSO_3$, 0.012 g. of $FeSO_4 \cdot 7H_2O$, and 0.5 of $C_7H_{15}COOK$, copolymers of the following compounds are formed in the proportions stated. The ingredients in the left hand column polymerize 1,2 only, forming pendant groups.

That which is claimed is:
1. A copolymer consisting essentially of
   (a) 5 to 95 mol percent of

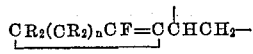

units where each R is selected from the group consisting of hydrogen, fluorine, and perfluoroalkyl

| Percent of mixture and copolymer | Percent of mixture and copolymer |
|---|---|
| 50% $CF_2CFCF_2CF=CCH=CH_2$ with $CF_3$ pendant | 50% $CF_3CF=CFCH=CH_2$ |
| 75% $CHCF_2CFCF=CCH=CH_2$ with $C_8F_{17}$ and $CF_3$ | 25% $C=CHCFCH_2$ with $C_8F_{17}$ and $CF_3$ |
| 90% $CF_2CF_2CFCF=CCH=CH_2$ with $C(CF_3)_3$ | 10% $CF_2=CFCH=CFH$ |
| 25% $CF_2(CF_2)_3CF=CCH=CH_2$ | 75% $CH_2=CCN$ with $CH_3$ |
| 1% $CF(CF_2)_3CF=CCH=CH_2$ with $CF_3$ | 99% $CHF=CHCN$ |
| 10% $CF(CF_2)_3CF=CCH=CH_2$ with $C_3F_7$ | 90% $CH=CFCF=CH$ with $CF_3$ and $CF_3$ |
| 99% $CH(CF_2)_3CF=CCH=CH_2$ with $C_8F_{17}$ | 1% (benzene ring)—$CH=CH_2$, $CH=CH_2$ |
| 95% (perfluorocyclopentene)—$CH=CH_2$ | 5% $CF_3$-(benzene ring)—$CH=CH$ |
| 25% (perfluorocyclopentene)—$CH=CH_2$ | 50% $CH_2=CF-CN$ |
| and | 55% $CF_3CF=CHCH=CFCF_3$ and |
| 25% (perfluorocyclohexadiene with $CH_3$)—$C=CH_2$ | 5% (F-substituted cyclohexane)—$C=CH_2$, $CH$, $C=CH_2$, $CH_3$ |
| 40% (perfluorocyclopentene)—$CH=CH_2$ | | radicals, no more than one R group being hydrogen, and $n$ is an integer of 2 to 3; and (b) 95 to 5 mol percent of units selected from the group consisting of (1) 

units, where X is selected from the group consisting or fluorine and hydrogen, at least one X being hydrogen, V is selected from the group consisting of the trifluoromethyl radical and fluorine, and R is as defined above, the number of X's that are hydrogen exceeding the number of R's that are hydrogen;

(2) 

units, where X is as defined above, and Q is selected from the group consisting of hydrogen, fluorine, and methyl, at least one of the above symbols being hydrogen;

(3) $\quad -CZ_2CX=CXCZ_2-$ where Z is selected from the group consisting of fluorine, the trifluoromethyl radical and hydrogen, and X is as defined above; and (4) 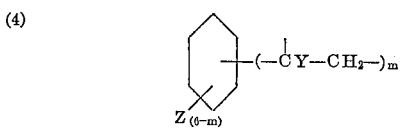

where $m$ is an integer of 1 through 2 each $(-CY-CH_2-)$ group present being separately attached to the above phenyl ring, Y is selected from the group consisting of the methyl radical and hydrogen, and Z is as defined above.

2. The copolymer of claim 1 where (a) is

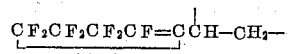

and (b) is

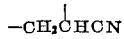

3. The copolymer of claim 1 where (a) is

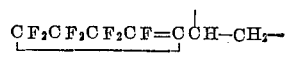

and (b) is $-CH_2CH=CHCH_2-$.

4. The copolymer of claim 1 where (a) is

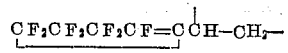

and (b) is

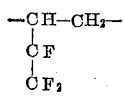

References Cited by the Examiner

UNITED STATES PATENTS

| | | | |
|---|---|---|---|
| 2,958,683 | 11/1960 | Hopkin et al. | 260—87.5 |
| 2,964,507 | 12/1960 | Knoth | 260—91.5 |
| 3,046,261 | 7/1962 | Iserson | 260—87.5 |
| 3,111,509 | 11/1963 | Folt | 260—91.5 |

OTHER REFERENCES

Coffman et al.: J.A.C.S., 71 (1949), pp. 490–6.

JOSEPH L. SCHOFER, *Primary Examiner.*

H. Wong, *Assistant Examiner.*